(12) United States Patent
Bonino et al.

(10) Patent No.: US 9,745,139 B2
(45) Date of Patent: Aug. 29, 2017

(54) DEVICE FOR THE FAST TRANSPORT OF OBJECTS

(71) Applicant: Langatech S.R.L., Cueno (IT)

(72) Inventors: Alessandro Bonino, Alessandria (IT); Giovanni Bonino, Alessandria (IT)

(73) Assignee: LANGATECH S.R.L., Cuneo (IT)

( * ) Notice: Subject to any disclaimer, the term of this patent is extended or adjusted under 35 U.S.C. 154(b) by 165 days.

(21) Appl. No.: 14/872,560

(22) Filed: Oct. 1, 2015

(65) Prior Publication Data

US 2016/0236871 A1 Aug. 18, 2016

(30) Foreign Application Priority Data

Feb. 16, 2015 (EP) ..................................... 15155281

(51) Int. Cl.
*B65G 31/00* (2006.01)
*B23P 19/00* (2006.01)
(Continued)

(52) U.S. Cl.
CPC ............ *B65G 31/00* (2013.01); *B23P 19/003* (2013.01); *B23P 19/005* (2013.01); *B61B 13/10* (2013.01);
(Continued)

(58) Field of Classification Search
CPC ....... B23P 19/00; B23P 19/001; B23P 19/005; B61B 13/10; B61B 13/12; B61B 13/122;
(Continued)

(56) References Cited

U.S. PATENT DOCUMENTS

| 6,959,835 B2* | 11/2005 | Bloch | ....................... B21J 15/32 221/278 |
| 8,805,575 B1* | 8/2014 | Bloch | ....................... B21J 15/32 221/1 |

(Continued)

FOREIGN PATENT DOCUMENTS

| DE | 42 19 190 C1 | 7/1993 |
| DE | 103 32 655 A1 | 2/2005 |

(Continued)

OTHER PUBLICATIONS

Database WPI Week 198219 Thomson Scientific, ondon, GB; AN 1982-F5753E XP002738797 & SU 848 434 AI (Voron Avtozapchast) Jul. 23, 1981.

*Primary Examiner* — Jason C Smith
(74) *Attorney, Agent, or Firm* — Arent Fox LLP; Michael Fainberg

(57) ABSTRACT

A device for the transport of singled objects comprising a first tube section, delimiting a loading channel from a rear aperture to a front aperture, a loading aperture for the insertion of the singled object in the loading channel, a second tube section connected to the rear aperture of the first tube section and delimiting a guide channel, a thrust generator suitable to generate in the loading channel a thrust in the transport direction, a transport support suitable to accommodate the object and arranged in the loading channel in such a way as to be launched in the transport direction along the guide channel and a rebound device positioned in the guide channel to make the transport support bounce, causing the release of the object from transport.

15 Claims, 7 Drawing Sheets

(51) Int. Cl.
*B65G 51/04* (2006.01)
*B61B 13/10* (2006.01)
*B65G 51/28* (2006.01)

(52) U.S. Cl.
CPC ............ *B65G 51/04* (2013.01); *B65G 51/28* (2013.01); *B65G 2207/40* (2013.01)

(58) Field of Classification Search
CPC ...... B61B 13/125; B65G 51/04; B65G 51/00; B65G 51/06; B65G 51/08; B65G 51/10; B65G 51/12; B65G 51/14; B65G 51/26; B65G 51/28; B65G 51/36
See application file for complete search history.

(56) References Cited

U.S. PATENT DOCUMENTS

| | | | | |
|---|---|---|---|---|
| 2003/0034355 A1* | 2/2003 | Bloch | ................ | B21J 15/32 221/13 |
| 2006/0226194 A1* | 10/2006 | Bradbury | ................ | B21J 15/32 227/119 |
| 2007/0084039 A1* | 4/2007 | Bloch | ................ | B21J 15/32 29/525.01 |
| 2008/0193230 A1* | 8/2008 | Dear | ................ | B21J 15/34 406/191 |
| 2011/0121013 A1* | 5/2011 | Delattre | ................ | B23P 19/003 221/133 |
| 2011/0290847 A1* | 12/2011 | Drant | ................ | B21J 15/025 227/119 |
| 2014/0377018 A1* | 12/2014 | Stepan | ................ | B65G 51/04 406/188 |
| 2016/0236871 A1* | 8/2016 | Bonino | ................ | B65G 51/28 |
| 2016/0340130 A1* | 11/2016 | Bonino | ................ | B65G 47/34 |

FOREIGN PATENT DOCUMENTS

EP   1 116 678 A1   7/2001
EP   2 394 777 A1   12/2011

* cited by examiner

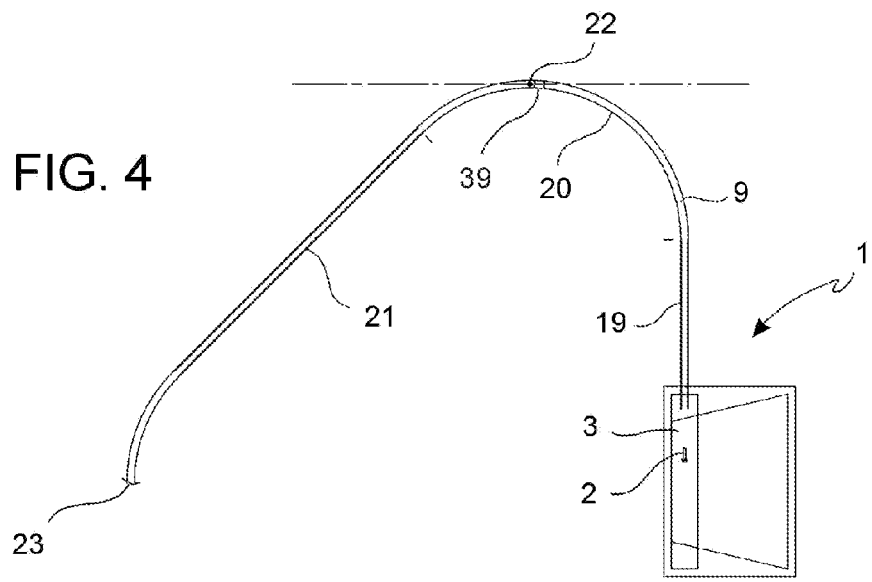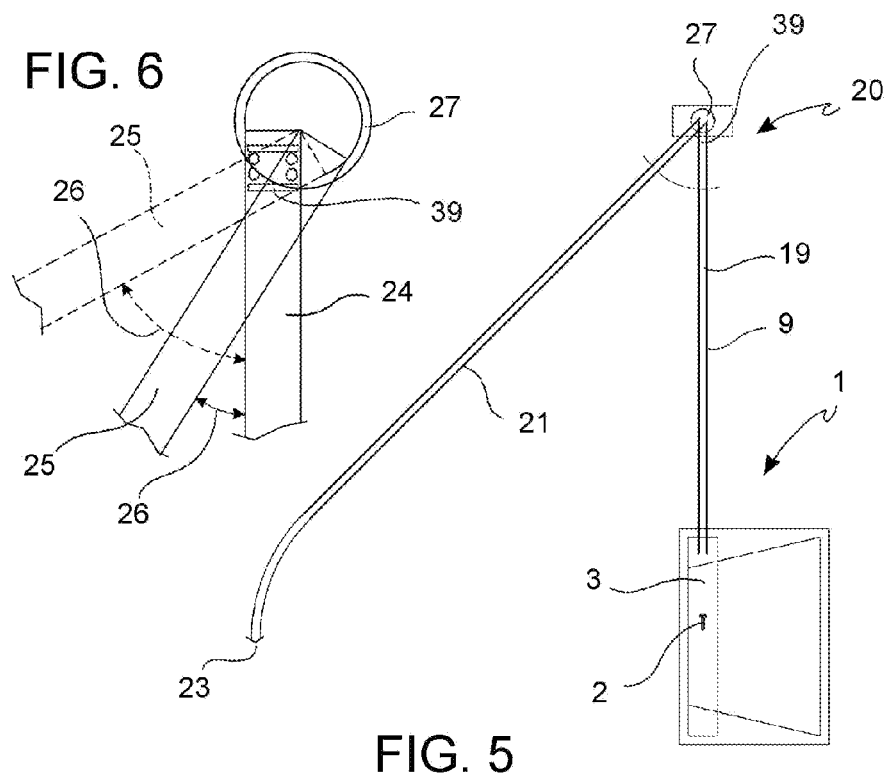

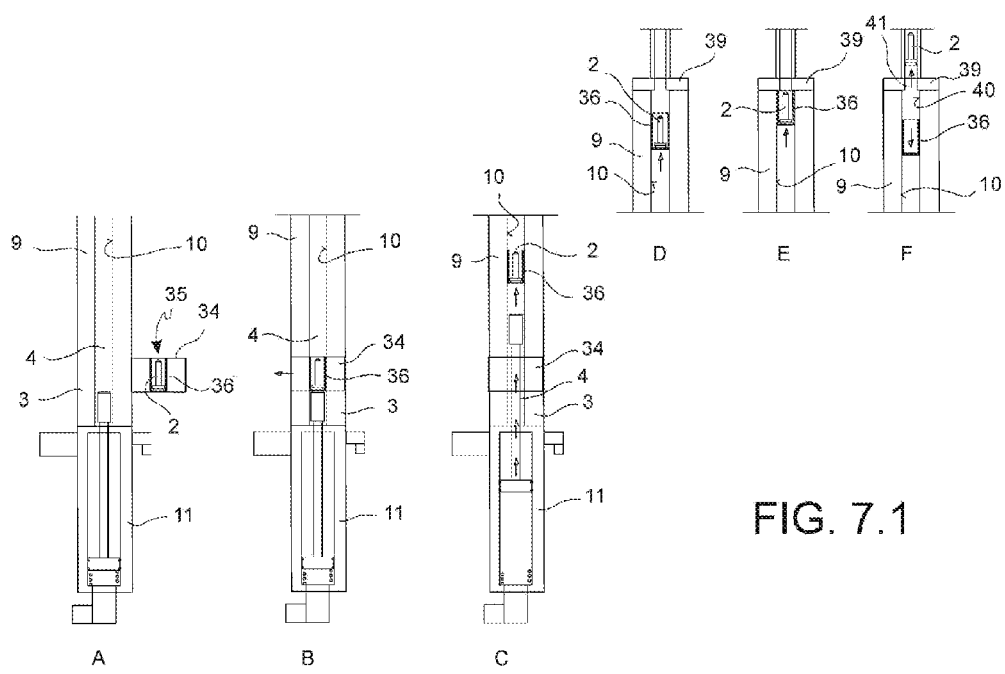
FIG. 7.1

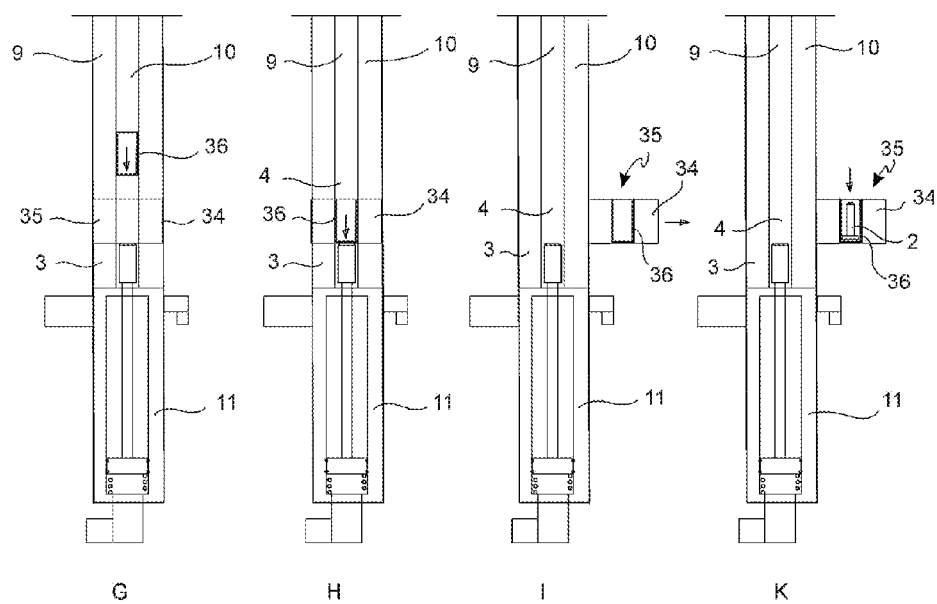
FIG. 7.2

DEVICE FOR THE FAST TRANSPORT OF OBJECTS

TECHNICAL FIELD

This invention generally relates to systems for the individual feeding of singularized objects, for example to handling, processing and assembly units in highly-automated industrial applications, for example automated or robotized assembly in the automotive or household appliance sectors. More particularly, the invention relates to a device for the fast transport of objects.

BACKGROUND

Among other applications, a practical example of the use of devices for the fast transport of singularized objects is the individual feeding of screws to robot screwers or assembly stations in production, machining, assembly, packaging or similar lines of industrial or consumer products.

It is known that already singularized screws can be fed to the screwer through a flexible tube connected between a screw magazine and screwer that allows the screwer to move (for example, in a robotized manner or by a screwdriver operator) with respect to the magazine that contains the screws.

The previously singled screw is inserted into an inlet portion of the flexible tube, to which a source of compressed air is connected, to "shoot" the screw pneumatically through the flexible tube to the outlet of the tube connected to the screwer.

However, in the industrial field, fixed compressed air installations and the use of compressed air to "shoot" the singled objects to the destination are increasingly criticized for the high consumption and cost of compressed air, noise and the safety risks related to powerful blasts of air.

For example, the preparation and maintenance of machining assembly stations makes it essential to detach and reattach the flexible transport tubes and, with the outlet end of the tube detached or, in any case, open and exposed, the unprotected blast of air can injure the user (either directly or indirectly by blowing or agitating dust, chips, etc.). Moreover, the object transported by means of compressed air can become a projectile even at the outlet of the tube due to the high pneumatic pressure that continues to act on the object during the entire path along the tube.

The fast transport systems of the prior art are also unsuitable for the transport of objects of delicate shape or material (material subject to abrasion, shapes with thin projections or objects covered with paint or powder), since in the initial phase of the "shooting" of the object along a rising portion of the tube, the object itself but also the inner surface of the tube are subject to undesirable friction and mechanical stress, in addition to the fact that the jet of compressed air can damage the coatings or surface treatments of the object to be transported.

There is, thus, the need to reduce the use of compressed air and safety risks in the fast transport of objects and, at the same time, to also adapt fast transport systems for the fast transport of delicate objects.

These and other purposes are achieved through a device for the fast transport of objects according to claim 1. The dependent claims relate to advantageous embodiments.

SUMMARY

According to the invention, a device for the transport of objects comprises:
A) a tubular transport guide (3, 10) with:
a first tube section (3) forming a loading channel (4) and a loading aperture (8) for the insertion of the object (2) in the loading channel (4),
a second tube section (9) forming a guide channel (10) extending from the loading channel (4) in a direction of transport and,
B) a thrust generator (11, 11') suitable to generate a thrust in the loading channel (4) in the direction of transport,
C) a transport support (36) positionable in the loading channel (4) and movable from the loading channel (4) along the guide channel (10),
wherein the thrust of the thrust generator (11, 11') acts on the transport support (36) launching it in the direction of transport along the guide channel (10), said transport support (36) forming a seat (37) that holds the object (2) during the launch of the transport support (36) in the transport direction,
D) release and return means associated to the guide channel (10) and comprising:
release means that cause the release of the object (2) from the seat (37) of the transport support (36) in a predetermined release area (47) in the guide channel (10),
return means that reverse the direction of movement of the transport support (36) in the guide channel (10) and return the transport support (36) in the direction opposite to the direction of transport from the release area (47) backwards in the loading channel (4),
passage means that allow the passage of the object (2) released from the transport support (36) in the transport direction along the guide channel (10).

The release and return means (39) may include (without being limited in this sense) a rebound device (39) with a rebound surface (40) formed in the guide channel (10) so as to prevent the passage of transport support (36) and make it bounce in the opposite direction to the transport direction, causing at the same time the release of the object (2) from the transport support (36), and an object passage (41) that allows passage of the object (2) released from the transport support (36) in the transport direction, in this way realizing the release, return and passage means.

Similarly, the seat (37) of the transport support (36) can comprise a cavity (37) with a front aperture (38) facing in the transport direction so that it can receive the object (2) in the cavity (37) and to release the object (2) from the cavity (37) through the front aperture (38) in the transport direction.

Thanks to transport by means of the transport support, which acts as a shuttle that goes forward and backwards in the guide channel, it eliminates possible damage of the tube and of the object received in a protected manner in or by the transport support, at least during a first section (usually an ascending section) of the guide channel. Thanks to a better adaptation of shape between the transport support (which can be perfectly cylindrical externally) and the guide channel, it is possible to reduce the pneumatic pressure and flow rate, achieving savings of compressed air on the order of 75% compared with the prior art.

In case of a fault or failure (for example, detachment of the transport tube or problem controlling the solenoid valve that controls the flow of compressed air), the transport support acts as a safety "plug" and prevents a potentially harmful flow of compressed from going beyond the release area or the position of the rebound device.

BRIEF DESCRIPTION OF THE DRAWINGS

To better understand the invention and appreciate the advantages, hereinafter several embodiments will be described by way of non-limiting example, making reference to the figures, wherein:

FIGS. 4, 5 and 6 illustrate a guide channel of a transport device according to embodiments of the invention, FIGS. 7.1 and 7.2 illustrate a transport device according to a further embodiment, as well as an operating sequence.

DETAILED DESCRIPTION

Figure 1:
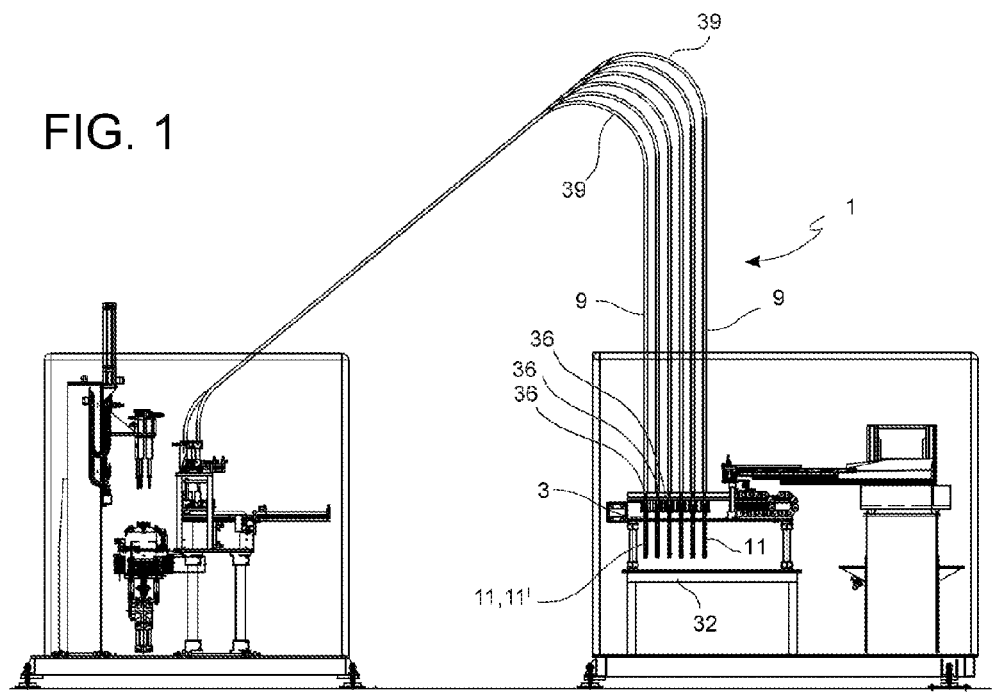
FIG. 1 shows a fast transport system for screws, along multiple guide channels connected to an automatic screwing station.

With reference to the figures, a device 1 for transport of objects 2 comprises a tubular transport guide 3,10 with a first section of tube 3 forming a loading channel 4 and a loading opening 8 for the insertion of the object 2 in the loading channel 4, and a second section of tube 9 forming a guide channel 10 extending from the loading channel 4 in a transport direction.

The device 1 also comprises a thrust generator 11, 11' suitable to generate a thrust in the loading channel 4 in the transport direction, as well as a transport support 36 positionable in the loading channel 4 and movable from the loading channel 4 along the guide channel 10. The thrust of the thrust generator 11, 11' acts on the transport support 36 launching it in the transport direction along the guide channel 10.

The transport support 36 forms a seat 37 that partially or completely receives or holds the object 2 in engagement with the support 36 during its launch in the transport direction. The transport support 36 can, thus, form a protective housing that receives the object 2 inside it, or a protective support that ensures a correct positioning of the object 2 during its movement in the guide channel 10.

The seat 37 can, thus, form a female seat (cavity) and/or a male seat (projection).

The device 1 further comprises release and return means 39 associated to the guide channel 10 and comprising:

release means that cause the release of the object 2 from the seat 37 of the transport support 36 in a predetermined release area 47 in the guide channel 10, return means that reverse the direction of movement of the transport support 36 in the guide channel 10 and return the transport support 36 in the direction opposite to the direction of transport from the release area 47 backwards in the loading channel 4, passage means that allow the passage of the object 2 released from the transport support 36 in the transport direction along the guide channel 10.

The release and return means 39 may include (without being limited in this sense) a rebound device 39 with a rebound surface 40 formed in the guide channel 10 so as to prevent the passage of transport support 36 and make it bounce in the opposite direction to the transport direction, allowing or causing at the same time the release of the object 2 from the transport support 36, and an object passage 41 that allows passage of the object 2 released (by inertial effect) from the transport support 36 in the transport direction, in this way realizing the release, return and passage means.

The seat 37 of the transport support 36 may comprise a cavity 37 with a front aperture 38 facing in the transport direction so that it can receive the object 2 in the cavity 37 and to release the object 2 from the cavity 37 through the front aperture 38 in the transport direction.

Thanks to the transport by means of the transport support, which acts as a shuttle that goes forward and backwards in the guide channel 10, it eliminates possible damage of the tubes 3,9 and of the object 2 received in a protected manner in or by the transport support 36, at least during a first section (usually an ascending section) of the guide channel 10. Thanks to a better adaptation of shape between the transport support 36 (which can be perfectly cylindrical externally) and the guide channel 10, it is possible to reduce the pneumatic pressure and flow rate, achieving savings of compressed air on the order of 75% compared with the prior art.

In case of a fault or failure (for example, detachment of the transport tube or problem controlling the solenoid valve that controls the flow of compressed air), the transport support 36 acts as a safety "plug" and prevents that a potentially harmful flow of compressed air may go beyond the release area 47, e.g. the position of the rebound device 39.

In one embodiment, the transport support 36 has the shape of a cup, preferably cylindrical, with a closed and substantially circular bottom. This reduces the friction between the transport support 36 and the guide channel 10 and increases the effectiveness of the pneumatic thrust or, alternatively, of the mechanical thrust.

In embodiments, the loading and/or guide channels 4,10 may have a closed or open, circular, oval, rectangular, square or polygonal section shape. They may be formed by closed or open section tubes, for example tubes with a longitudinal slot.

In an embodiment, the above-mentioned release and return means 39 associated to the guide channel 10 do not require the rebound effect.

The release means may include auxiliary urging means 45 configured to disengage the object 2 from the seat 37 and push the object from the seat 37 and farther forward in the guide channel 10, for example an auxiliary blower 45 positioned to blow in the release section of the guide channel 10 in such a way as to push the object 2 from the seat 37 in a section of the guide channel 10 (downstream of the release area 47), which can be transverse to the section of the guide channel 10 (upstream of and/or in the release area 47) through which the transport support 36 travels or aligned with said section of the guide channel 10.

Alternatively, the release means may comprise means that position the transport support 36 in such a way that the object disengages the seat 37 due to the effect of gravity or of inertial force and falls or slides by effect of gravity or of inertial force farther forward in the guide channel 10 or in a transport direction which can be transverse to the section of the guide channel 10 (upstream of and/or in the release area 47) through which the transport support 36 travels or aligned with said section of the guide channel 10. For instance, the release means may comprise an inclined deviation surface formed inside the seat 37 such that during movement of the transport support 36 in the transport direction or in the direction opposite to the transport direction, the object is pushed due to a wedge effect in a release direction and is released from the seat 37 when the above said object passage 41 is aligned with the seat 37 to allow passage of the object in said release direction.

The release and return means 39 may also include stop means 46 configured to stop the transport support 36 in a stationary manner, for a certain period of time, during the disengagement of the object 2 from the seat 37. The stop means can be realized by mechanical clamping means, releasable support means, stop cavities with means for the release of the stop, magnetic or electromagnetic means or pneumatic means, for example suction means, etc.

The return means can be realized by a back-thrust generator 48, for example mechanical, electromechanical, pneumatic, hydrodynamic, electromagnetic or magnetic, configured to move the transport support 36 from the release area 47 back into the loading channel 4.

The above-mentioned release and return means 39 associated to the guide channel 10 may comprise contact-less means, for example, magnetic or electromagnetic means.

In a further embodiment, the second tube section 9 forms an ascending section 19 extending from the front aperture 7 upwards, a descending section 21 extending from the top downwards, as well as a return section 20 formed between the ascending section 19 and the descending section 21 and extending through a point of maximum height 22 of the guide channel 10, wherein the release and return means 39, for example the rebound device, are positioned in the return section 21, preferably on the ascending side or in correspondence to the point of maximum height 22.

More precisely (FIGS. 1, 4, 5), the second tube section 9 may form:
an ascending section 19 at least approximately rectilinear, preferably substantially rectilinear, extending from the front aperture 7 vertically upwards (or with an inclination of <15°, preferably <8° with respect to the vertical),
a descending section 21 extending from the top downwards with a slope less than the slope of the ascending section 19, for example with an inclination between 30° and 60°, preferably between 40° and 50°, with respect to the vertical.

In this way, the object 2 to be transported, for example a screw, is transported by the transport support 36 during the ascending section 19 of the shot. Upon reaching the end of the ascending section 19, the transport support 36 is stopped and rebounded from rebound surface 40, leaving the object 2 free to continue through the object passage 41 in the transport direction. The object 2, pushed by the inertial and gravitational effect, proceeds in the return section 20 and descending section 21 while, in the meantime, the transport support 36 returns back down in the loading channel 4 and is once again available to be filled with a subsequent object 2 to be transported.

According to an embodiment, the rebound device 39 may comprise a cylindrical bushing inserted and fixed in the guide channel 10 and having a front surface that forms the rebound surface 40 and a longitudinal through hole that forms the object passage 41. Alternatively, the rebound device 39 may comprise a shoulder or a radial projection formed in the guide surface 10.

Advantageously, the rebound device 39 comprises elastic means 42 connected with the rebound surface 40 so as to brake the transport support 36 during the impact of the support 36 on the rebound surface 40 and push the transport support 36 elastically in the direction opposite to the transport direction.

Figure 8:
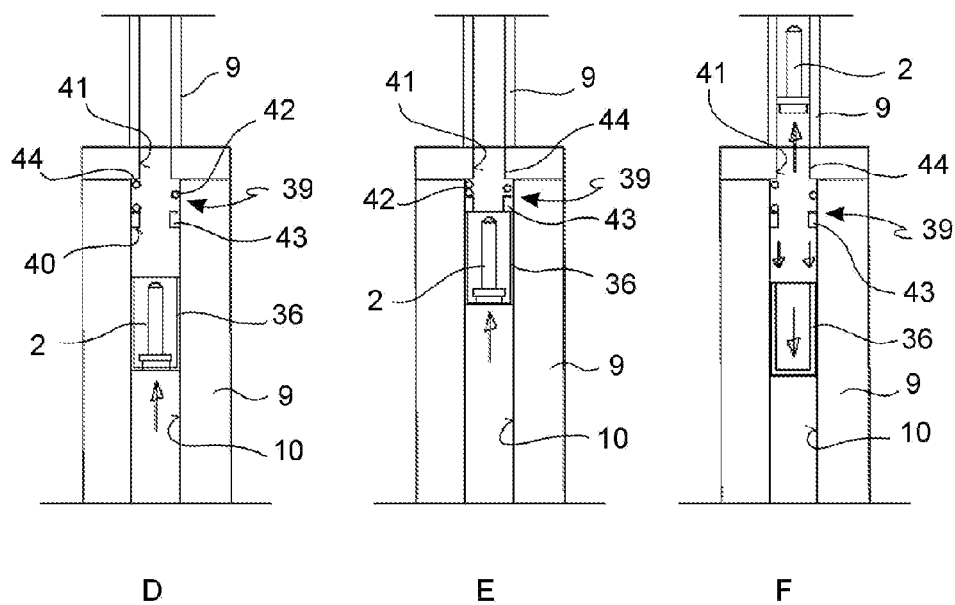
FIG. 8 illustrates a transport device according to another further embodiment and an operating sequence.
Figure 9:
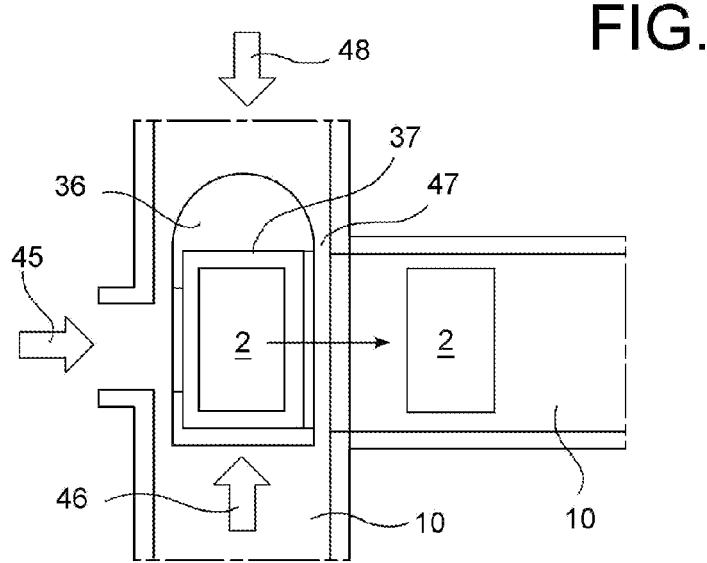
FIG. 9 illustrates the release and return means of the transport device according to a further embodiment.

More concretely, the elastic means may comprise an elastic spring 42, for example helical, arranged in a compressible manner between the rebound surface 40 (for example, a mobile bushing 43) and a stationary contrast point (for example, a shoulder or a fixed bushing 44) in the guide channel 10 (FIG. 8).

Thanks to the provision of the elastic means 36, it is possible to accumulate the residual kinetic energy of the transport support 36 and reuse it perform and/or speed up the return stroke of the transport support 36. This reduces impact noise and wear between the transport support 36 and the rebound device 39, prevents the stationing (with risk of stopping) of the transport support 36 in a dead point of the guide channel 10 with little or zero inclination, for example in the proximity of the point of maximum height 22, and increases the launch speed and frequency compared to the prior art.

In accordance with an embodiment, the device or thrust generator 11,11' is configured or adjustable so as to make the object 2 released from the transport support 36 enter into the descending section 21 with an initial descent speed of less than 30%, preferably between 25% and 5%, of the maximum speed of the transport support 36 in the transport direction. In this way, the object 2 reaches the beginning of the descending section 21 with a very small or substantially zero quantity of motion (vectorial value defined as the product of the mass of the object times its speed) and continues by the force of gravity alone, avoiding the risks related to "shots" of high final velocity.

The thrust generator 11,11' may comprise a pneumatic thrust device 11', for example a solenoid valve with a connection to a source of compressed air.

Alternatively, the thrust generator 11,11' comprises a fluid-dynamic cylinder-piston assembly 11 connected to the first tube section 3 and having a pusher 12 extending through the rear aperture 6 of the first tube section 3 in the loading channel 4. The pusher 12 is translatable in such a way as to mechanically push against the transport support 36 in the loading channel 4 and launch the transport support 36 together with the object 2 received in or by the transport support 36, along the guide channel 10.

Thanks to the fluid-dynamic cylinder-piston assembly 11 and the launch of the object 2 by means of mechanical thrust, it is possible to limit the use of compressed air to the sole actuation of the cylinder-piston assembly 11 that, as is known, requires very small quantities of compressed air.

In addition, the supply of fluid, in particular compressed air, to the fluid-dynamic actuator 11 occurs through a closed-conductor system, protected and not subject to disassembly and reassembly, thus avoiding blasts of compressed air into the environment.

The pneumatic actuation of the cylinder-piston assembly 11 does not involve substantial noise of air blasts or whistling and the total noisiness of the transport device 1 is reduced to the sole actuation of the cylinder-piston assembly and the movement of the pusher 12 on the object 2 to be launched.

In an embodiment, the first tube section 3 is substantially rigid and constituted by a first tubular wall 13, which can be made of metal, for example steel or brass, or a hard synthetic material, for example ABS. At least in correspondence to the rear aperture 6, the first tubular wall 13 has a radial thickness 14 preferably equal to, or greater than, the diameter 15 of the loading channel 4.

This ensures a sufficient rigidity of the shape of the loading channel 4 and allows the first tubular wall 13 to receive fixing members 16 of the thrust generator, for example a cylinder-piston assembly 11.

An inner surface 17 of the loading channel 4 (but also of the guide channel 10) can be coated with an anti-friction, anti-wear and/or self-lubricating layer, for example titanium nitride (TiN), titanium carbonitride (TiCN), chromium nitride (CrN), Carbon (PLC=polymer like carbon) or molybdenum disulphide (MoS2), in order to facilitate the sliding of the object 2 during acceleration and reduce wear of the loading channel 4.

The loading channel 4 (and also the guide channel 10) may have a cross section of a shape substantially, or at least partially, complementary to an external profile of the transport support 36, so as to keep a particular orientation of the transport support 36 during its launch and transport. For example, in FIG. 2, the loading channel 4 and the guide channel 10 may have a circular cross section complementary, and slightly increased, with respect to the circular profile of the bottom of the support 36.

In condition of use, the first tube section 3 preferably has a vertical or inclined orientation with the rear aperture 6 facing downwards so that the support 36 inserted into the loading channel 4 automatically slides, due to the gravitational effect, towards the rear aperture until it rests on the pusher 12. This ensures that the pusher 12 acts on the support 36 during the entire stroke of the piston of the pneumatic actuator 11 and facilitates control of the launch of the object 2, avoiding undesirable impact effects.

In order to reduce the risk of obstacles, the loading aperture 8 is formed by a transverse hole in the first tubular wall 13, which opens into the loading channel 4 in the (immediate) vicinity of the rear aperture 6. Even the loading aperture 8 may have a cross-sectional profile at least partly complementary (but slightly increased with respect to) an external profile of the support 36. This allows a guided loading of the support 36 with the preservation of its predetermined orientation (FIG. 2A).

Alternatively, the transport support 36 can remain permanently in the loading channel 4 and guide channel 10 and the object 2 is inserted through the loading aperture 8 of the first tube section 3 in or in engagement with the transport support 36 already present in the loading channel 4.

In an embodiment, the second tube section 9 can be rigid or flexible and can be made, for example, of metal or synthetic material. Preferably, the guide channel 10 has a cross-sectional shape identical to the cross-sectional shape of the loading channel 4 and a connection area between the loading channel 4 and the guide channel 10 is preferably smooth, and free of steps.

Figures 2, 2A:
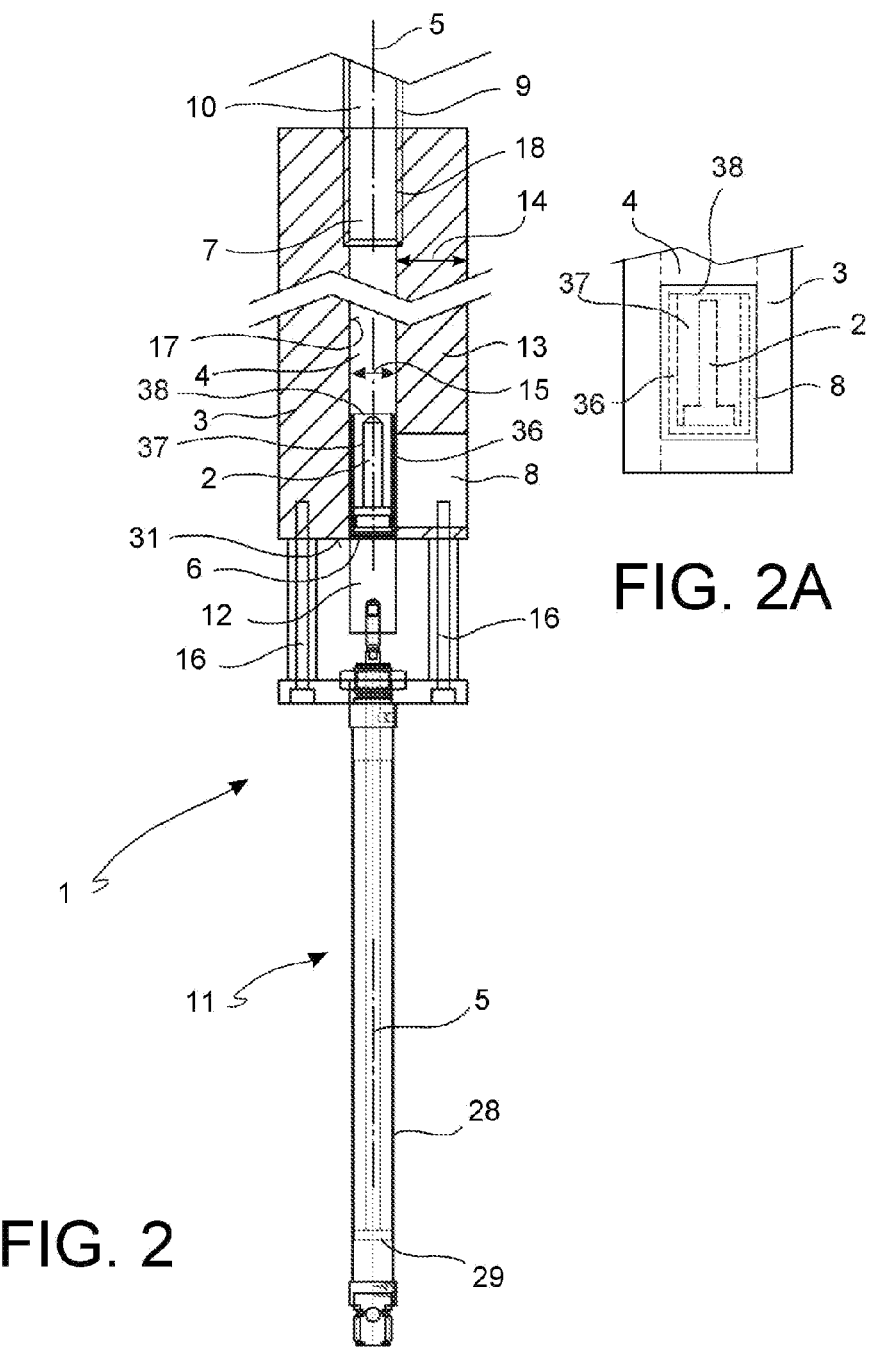
FIG. 2 is a sectional view of a device for transporting singled objects according to an embodiment.
FIG. 2A is a side view of a detail according to an embodiment of the transport device in FIG. 2.
Figure 3:
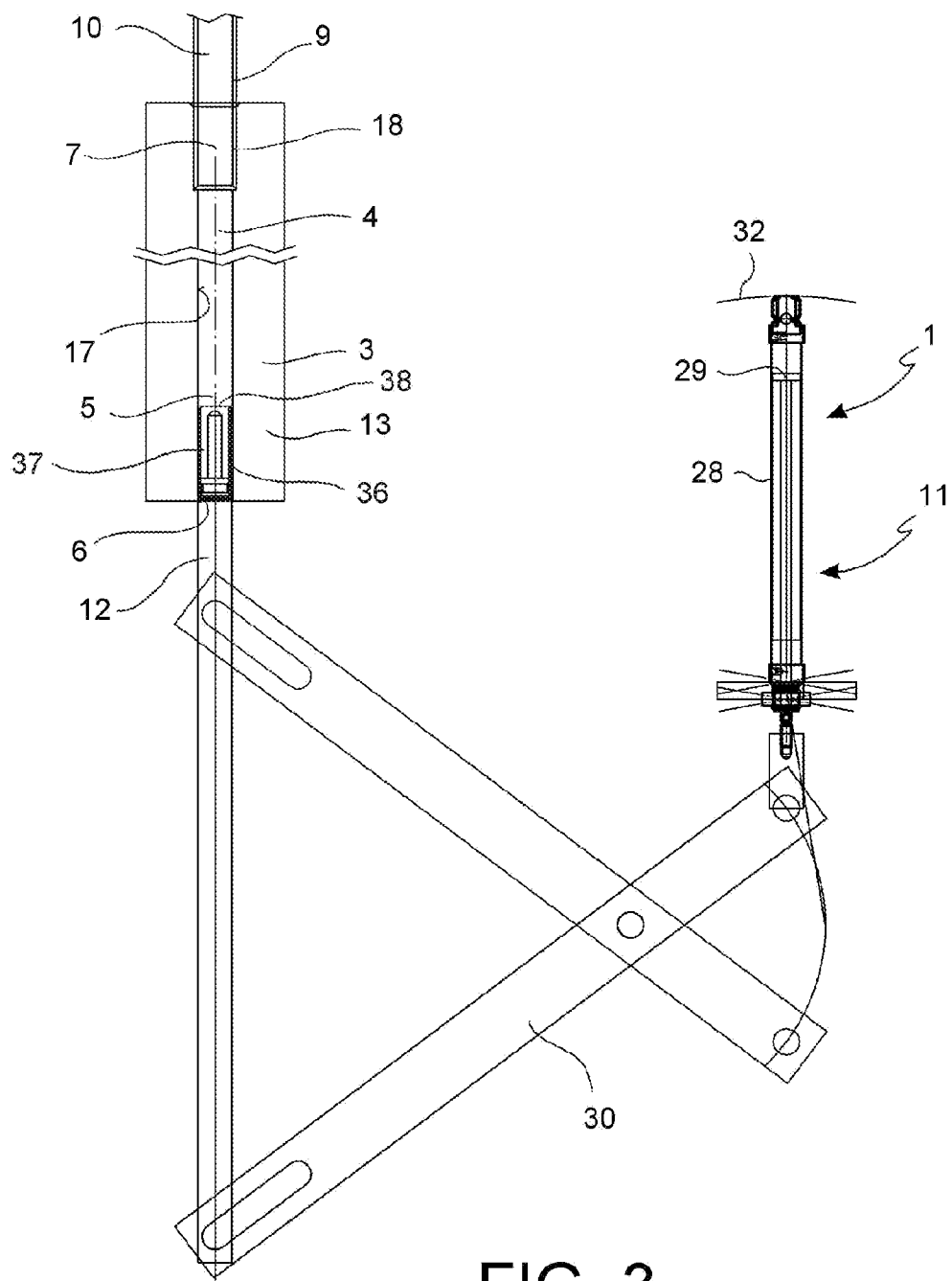
FIG. 3 is a schematic view of a device for transporting singled objects according to a second embodiment.

For example, the second tube section 9 can be inserted or screwed in a mounting seat 18 (preferably threaded) formed in the first tube section 3 at the front aperture 7 (FIGS. 2, 3).

Alternatively, the first tube section 3 and at least one ascending section 19 of the second tube section 9 may be formed in a single piece or welded or glued together.

The transport of the object 2 can occur in two ways.

The effect of the mechanical thrust on the transport support 36, caused by the actuation of the cylinder-piston assembly 11, could act on the object 2 predominantly along the sole ascending section 19, which is perfectly rectilinear and allows easy calibration of the pneumatic actuator 11 to overcome (barely) the point of maximum height 22 of the guide channel 10. At the height of the rebound device 39, the transport support 36 is separated from the object 2 and is bounced backwards, while the object 2, having passed the point of maximum height 22, can slide, due to the gravitational effect, along the descending section 21 until to the exit point 23.

Alternatively, the effect of the mechanical or pneumatic thrust on the transport support 36 may act on the object 2 along the entire guide channel 10 up to the exit point 23.

In an embodiment, the return section 20 follows a continuous curvature with a radius of curvature large enough not to impede the passage of the object along the guide channel 10 (FIGS. 1, 4).

In an alternative embodiment (FIGS. 5, 6), the return section 20 comprises an input section 24 and an output section 25, and a return wheel 27 placed between the entry section 24 and the exit section 25 and configured to receive the object 2 from the entry section 24, rotate and release the object 2 in the exit section 25. In this example, the rebound device 39 or, more generally the release and return means 39, may be realized by the return wheel 27 itself or positioned in the ascending section 19 upstream of the return wheel 27.

In addition or alternatively (FIG. 6), the return section 20 comprises an entry section 24 and an exit section 25 hinged to each other with the possibility of adjusting an orientation angle 26 between the entry section 24 and the exit section 25.

The fluid-dynamic cylinder-piston assembly 11, preferably pneumatic, comprises a cylinder 28 connected to a source of pressure fluid, for example compressed air, and a piston 29 slidably received in the cylinder 28 and movable by a pressure exerted by the fluid pressure fed into the cylinder 28.

The cylinder 28 may be directly fixed to the first tube section 3, for example with screws 16 screwed into a rear surface 31 of the first tube section 3 (FIG. 2). Alternatively, the cylinder 28 and the first tube section 3 can both be fixed to a common support structure 32 of the device 1 (FIGS. 1, 3).

The cylinder-piston assembly 11 can be oriented coaxially with the first tube section 3 (FIG. 2).

In an embodiment (FIG. 2), the piston 29 is directly connected with the pusher 12 so as to move the pusher 12 in the loading channel 4 without multiplication or demultiplication of the motion.

In an alternative embodiment (FIG. 3), the piston 29 is connected with the pusher 12 via a transmission 30, for example a lever mechanism, configured to multiply the motion of the pusher 12 with respect to the motion of the piston 29. In this way, for light objects 2, for example screws, which do not require high force, but a high launch speed, it is possible to obtain object launches up to maximum heights 22 well above 3.5 to 4 m, until now not achievable with the devices of the prior art. With the raising of the point of maximum height 22, it is possible to transport objects 2 to farther destinations from the starting point. This allows supplying more machining/assembly stations by means of the same transport station equipped with a plurality of transport devices 1.

As illustrated in FIG. 3 by way of non-limiting example, the ratio between the speed of the pusher 12 and the speed of the piston 29 is greater than 1 (multiplication of motion), in the illustrative example, the speed ratio is about 2.5.

This embodiment also allows the use of smaller pneumatic actuators 11 at the cost of the additional transmission 30.

Thus far, the invention has been described by making reference to the specific, but not restrictive, example of a compressed-air blower and a fluid-dynamic cylinder-piston assembly. Alternative embodiments contemplate the use of different actuators, for example an elastic pressure spring actuator, an electromagnetic actuator or a piezoelectric actuator.

In an embodiment (FIG. 7), the device 1 comprises a loader tray 34 inserted in the first tube section 3 in a sliding manner in a loading direction transverse to the longitudinal extension of the loading channel 4. The loader tray forms one or more loading seats 35 movable out of the first tube section 3 and into the first tube section 3 in alignment with the loading channel 4 so as to receive the transport support 36 and the singled object 2 outside of the first tube section 3 and release the object 2 inside the first tube section 3 in the loading channel 4.

Alternatively, the loader tray forms one or more loading seats 35 movable out of the first tube section 3 and into the first tube section 3 in alignment with the loading channel 4 so as to receive the singled object 2 outside of the first tube section 3 and release the object 2 inside the first tube section 3 (making it slide) in, or in engagement with, the transport support 36 already in position in the loading channel 4.

Furthermore, at least one of the loading seats 35 (or at least a through hole that does not serve as loading seat 35) of the loader tray 34 is configured for forming a section of the loading channel 4. In this way it is possible to receive a new object 2 (or an additional transport support 36 with object 2) in the loading seat 35 placed outside the first tube section 3, at the same time as the launch of the support 36 with the object 2 previously loaded in the loading channel 4.

Advantageously, the external profile of the support 36 may have a shape compatible or complementary, which is to say substantially equal but slightly smaller (to allow sliding), with respect to the internal section profile of the loading channel 4 and guide channel 10 previously described, for example to reduce pressure losses in the case of a pneumatically-thrust support 36.

There is the further possibility of configuring the external profile of the support 36 so as not to follow, in a continuous and complementary manner, the shape of the loading 4 and/or guide 10 channels, but to form (in a plane transverse to the longitudinal extension of the channel) larger interstices alternating with smaller interstices between the support 36 and the channel 4,10. This can be realized, for example, by means of an external profile shape of the support 36 with a circumferential succession of more convex areas alternated with less convex areas, such as in the case of a polygonal profile that could be received in a channel of circular cross section, to reduce, for example, sliding friction in the case of a mechanically-thrust support 36.

While not limited to a specific application, the invention can be advantageously implemented in a variety of machines for the manufacture and/or assembly of industrial products, for example, household appliances, automobiles and electronic devices.

Obviously, a person skilled in the art, in order to satisfy contingent and specific needs, may make further modifications and variations to the transport device 1, all however contained within the scope of the invention as defined by the following claims.

Advantageously, the external profile of the support 36 may have a shape compatible or complementary, which is to say substantially equal but slightly smaller (to allow sliding), with respect to the internal section profile of the loading 4 and guide 10 channels previously described, for example to reduce pressure losses in the case of a pneumatically-thrust support 36.

There is the further possibility of configuring the external profile of the support 36 so as not to follow, in a continuous and complementary manner, the shape of the loading 4 and/or guide 10 channels, but to form (in a plane transverse to the longitudinal extension of the channel) larger interstices alternating with smaller interstices between the support 36 and the channel 4,10. This can be realized, for example, by means of an external profile shape of the support 36 with a circumferential succession of alternating with more convex areas and less convex areas, such as in the case of a polygonal profile that could be received in a channel of circular cross section, to reduce, for example, sliding friction in the case of a mechanically-thrust support 36.

The invention claimed is:

1. Device for the transport of objects, comprising: A) a tubular transport guide with: a first tube section forming a loading channel s and a loading aperture for the insertion of the object in the loading channel, a second tube section forming a guide channel extending from the loading channel in a direction of transport and, B) a thrust generator suitable to generate a thrust in the loading channel in the direction of transport, C) a transport support positionable in the loading channel and movable from the loading channel along the guide channel, wherein the thrust of the thrust generator acts on the transport support launching it in the direction of transport along the guide channel, said transport support forming a seat that holds the object during the launch of the transport support in the transport direction, D) release and return means associated to the guide channel and comprising: release means that cause the release of the object from the seat of the transport support in a predetermined release area in the guide channel, return means that reverse the direction of movement of the transport support in the guide channel and return the transport support in the direction opposite to the direction of transport from the release area backwards in the loading channel, passage means that allow the passage of the object released from the transport support in the transport direction along the guide channel, wherein the release and return means comprise: a rebound surface formed in the guide channel in such a way as to prevent the passage of the transport support and make it rebound in the opposite direction to the transport direction, allowing, at the same time, the release of the object from the transport support, an object passage that allows passage, in the transport direction, of the object released from the transport, support, thus realizing said release, return and passage means, comprising elastic means connected with the rebound surface so as to brake the transport support during the impact of the support on the rebound surface and push the transport support elastically in the direction opposite to the transport direction.

2. Device according to claim 1, wherein the release and return means comprise auxiliary stimulation means configured to disengage the object from the seat.

3. Device according to claim 1, wherein the release and return means comprise stop means configured to stop the transport support in a stationary way during the disengagement of the object from the seat.

4. Device according to claim 1, wherein said seat comprises a cavity with a front aperture facing in the transport direction so that it can receive the object in the cavity and to release the object from the cavity through the front aperture in the transport direction.

5. Device according to claim 4, wherein the transport support has a cup-shape with a bottom shape complementary to but slightly smaller with respect to the shape of the internal section of the channel.

6. Device according to claim 1, wherein the second tube section forms an ascending section extending from the loading channel upwards, a descending section extending from the top downwards, and a return section formed between the ascending section and the descending section and extending through a point of maximum height of the guide channel, wherein the release and return means are positioned in the return section upstream or in correspondence to the point of maximum height.

7. Device according to claim 1, comprising a cylindrical bushing fixed in the guide channel and having a front surface that forms the rebound surface and a longitudinal through hole that forms the object passage.

8. Device according to claim 1, comprising a radial projection formed in the guide channel and that the rebound surface.

9. Device according to claim 1, wherein the elastic means comprise an elastic spring arranged in a compressible manner between the rebound surface and a stationary contrast point in the guide channel.

10. Device according to claim 1, wherein the release and return means comprise elastic means that prevent the stationing of the transport support in a dead point of the guide channel with insufficient inclination to make the transport support slide due to the effect of gravity.

11. Device according to claim 1, wherein the thrust generator comprises a fluid-dynamic cylinder-piston assembly connected to the first tube section and having a pusher extending through a rear aperture of the first tube section in the loading channel, said pusher being translatable in such a way as to mechanically push against the transport support in the loading channel.

12. Device according to claim 1, wherein, during the loading of the object in the loading channel, the transport support carrying or containing the object is inserted through the loading aperture in the loading channel.

13. Device according to claim 1, wherein, during the loading of the object in the loading channel, the sole object is inserted through the loading aperture and made to slide in or on the transport support already present in the loading channel.

14. Device according to claim 1, wherein the release and return means comprise:
   a rebound surface formed in the guide channel in such a way as to prevent the passage of the transport support and make it rebound in the opposite direction to the transport direction, causing, at the same time, the release of the object from the transport support due to inertial force,
   an object passage that allows passage, in the transport direction, of the object released from the transport support,
   elastic means connected with the rebound surface so as to brake the transport support during the impact of the support on the rebound surface and push the transport support elastically in the direction opposite to the transport direction.

15. Device according to claim 1, wherein the release and return means comprise:
   a rebound surface formed in the guide channel in such a way as to prevent the passage of the transport support and make it rebound in the opposite direction to the transport direction, allowing, at the same time, the release of the object from the transport support,
   an object passage that allows the object to be released from the transport support and to move further in the transport direction of the object,
   elastic means connected with the rebound surface so as to brake the transport support during the impact of the support on the rebound surface and push the transport support elastically in the direction opposite to the transport direction.

* * * * *